Dec. 23, 1941.  W. S. SAUNDERS  2,266,994
OPERATING LEVER MECHANISM
Filed Nov. 20, 1939
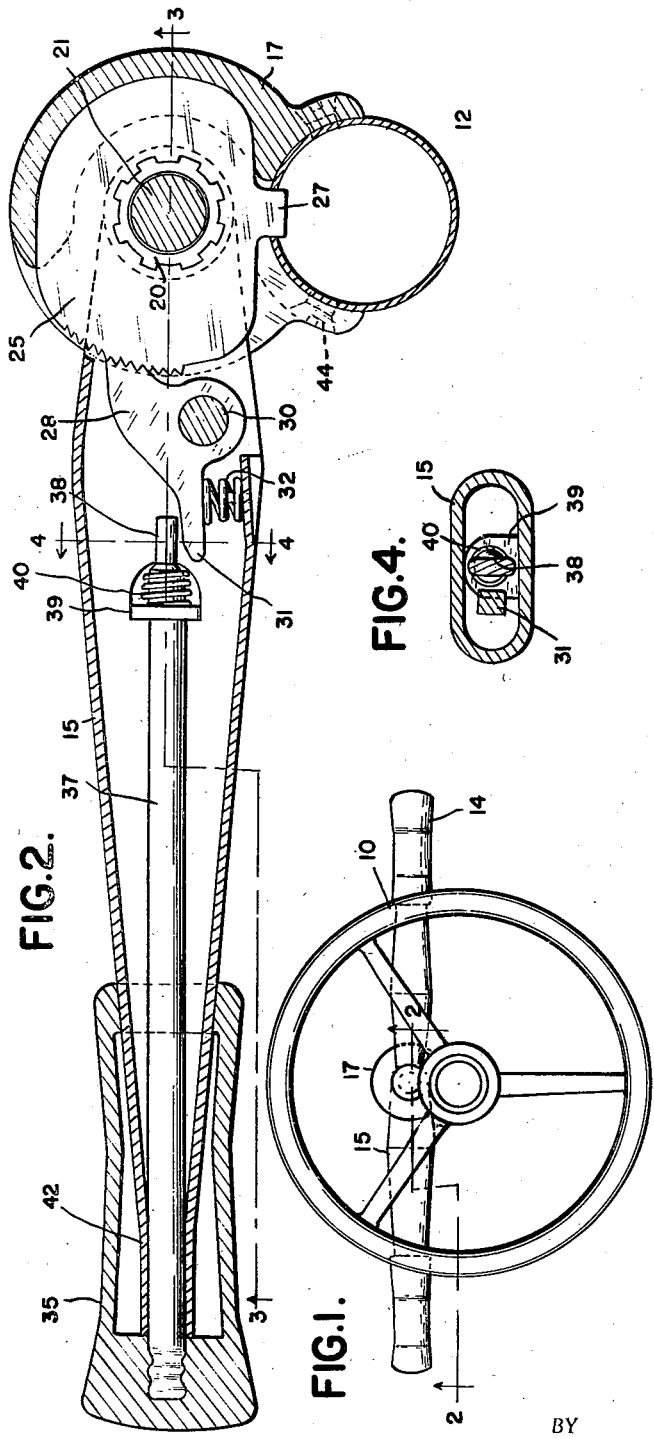
INVENTOR.
WALTER S. SAUNDERS
BY
ATTORNEYS Patented Dec. 23, 1941

2,266,994

UNITED STATES PATENT OFFICE 2,266,994

OPERATING LEVER MECHANISM

Walter S. Saunders, Pontiac, Mich., assignor to the American Forging and Socket Company, Pontiac, Mich., a corporation of Michigan Application November 20, 1939, Serial No. 305,302

3 Claims. (Cl. 74—485)

This invention relates to lever-type operating handles, particularly of the variety employed to control the emergency brakes of motor vehicles.

An important object of the invention is to provide an improved control handle mechanism of the character indicated which is adapted to be mounted upon the steering column of a motor vehicle, and to swing in a plane substantially parallel to that of the steering wheel.

Another object is to provide such a control lever mechanism having pawl and ratchet means for holding the same in any set position, against unwanted return movement, and provided with improved operating mechanism for the pawl and ratchet means, which operating mechanism is easy and convenient to use, simple in construction, attractive in appearance, and so arranged that it is easily operable by persons not possessed of great strength in the hands or fingers.

A related object is to provide in such a hand lever construction improved operating means for the pawl, which operating means has no parts apt to catch the fingers of the operator, or which requires operation by the fingers, and in which both the lever itself and the pawl release means are operable by a single hand-grip portion bodily movable with the lever and also rotatable about the longitudinal axis thereof, the arrangement being such that the full strength of the operator's hand may easily be applied to turn the hand-grip portion when it is desired to release the pawl.

Other objects and advantages will be apparent from the following description, wherein reference is made to the accompanying drawing illustrating a preferred embodiment of my invention and wherein similar reference numerals designate similar parts throughout the several views.

In the drawing:

Figure 1 is a plan view of the steering wheel of a motor vehicle, showing an operating lever constructed in accordance with the present invention, mounted adjacent the wheel.

Figure 2 is a sectional view on a larger scale, taken substantially on the line 2—2 of Figure 1, and looking in the direction of the arrows.

Figure 3 is a view partly in plan and partly in substantially central, longitudinal section, taken substantially at right angles to Figure 2; and Figure 4 is a cross section taken substantially on the line 4—4 of Figure 2, and looking in the direction of the arrows.

Referring now to the drawing:

Reference character 10 designates a steering wheel, which is supported by a steering column 12 in the usual or any desired manner, the steering column also serving as a support for the gear shift operating lever 14, the details of construction of which, since they form no part of the present invention, need not be considered.

My improved brake operating means comprises a hollow sheet metal lever 15, also carried by the steering column and projecting therefrom in the opposite direction to that in which the gear shift lever projects. The pivoted end of the lever is mounted and concealed in a casing 17 attached to the steering column, which casing may be formed of molded plastic or other suitable material. A tubular shaft 20 projects upwardly thereinto, and is splined at its end to receive the lever, which is provided with a complementarily splined opening to fit the shaft. The shaft 21 which provides connection between the gear shift lever and the transmission (unshown) may extend through the hollow shaft 20.

As best shown in Figure 4, the body of the lever may be somewhat flattened and at its pivoted end the shorter, curved walls are partly cut away so that the flat side walls provide spaced arms which engage the shaft 20 upon either side of an interposed ratchet plate 25. The ratchet plate is held against turning with the shaft and lever by means of an integral ear 27 which projects into a suitable opening in the steering column, as well as by being secured in the fixed casing 17. The pawl 28 is pivoted between the side arms of the lever, upon a cross pin 30, and provided with a rearwardly projecting arm 31 between which and the lower wall of the lever is trapped a pawl return spring 32.

The hand-grip portion 35, mounted upon the free end of the lever 15 is rotatable about the longitudinal axis thereof and attached to a shaft 37 which projects through the interior of the lever to a point overlying the pawl arm 31. At such point the shaft is flattened, and such flattened section 38 acts as a cam to release the pawl when the hand-grip is turned. A perforated ear 39 pressed upwardly from the lower wall of the lever serves as an inner bearing for the shaft 37 at a point adjacent the pawl, and also acts as an abutment for a spring 40 trapped between ear 39 and the flattened end 38 of the shaft. This constantly tends to draw the shaft inwardly and so maintain the handle 35 in position, while also serving to prevent rattle of the shaft and adjacent parts when the vehicle is in motion. The outer end of the lever 15 is shaped to snugly engage the shaft to serve as an outer bearing therefor, as indicated at 42.

The nose of the pawl 28 may be provided with a plurality of teeth, to increase the security despite the use of relatively small teeth. The spring 32 acts both to return the pawl to locked position, and to maintain the shaft and handle in their corresponding positions ready to release the pawl when the handle is turned in either direction.

The casing 17 may be molded over the ratchet plate 25 to firmly unite these parts. In order to assemble the construction upon the steering column, it is only necessary to slip the lever into position in the casing and ratchet assembly, with one part of the lever extending upon either side of the ratchet plate, and then place the assembly upon the shaft 20, the splines on the interior of the lever interfitting with those of the shaft; the lug 27 being at the same time fitted into the opening in the steering column. Thereafter, as by means of screws 44, the casing is attached to the steering column to secure the entire assembly in place thereupon.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. Means adapted to support an operating lever mechanism upon the steering column of a motor vehicle, comprising a casing adapted to be secured to a steering column in abutting relation thereto, ratchet means substantially enclosed in said casing and having a portion exposed at the portion of the casing which is adapted to abut the steering column, said exposed portion being adapted to be interconnected with the steering column whereby the latter may brace said ratchet means against unwanted movement, and means also appurtenant to said casing for supporting an operating lever in position to cooperate with said ratchet means.

2. Means as set forth is claim 1 in which said lever is fulcrumed at one end in said casing and said ratchet means includes a toothed portion accessible through an opening in the casing, said lever also extending through said opening, and its fulcrumed end being concealed in said casing.

3. Means as set forth in claim 1 in which said lever is fulcrumed at one end in said casing and said ratchet means includes a toothed portion accessible through an opening in the casing, said lever also extending through said opening, said casing being molded around said ratchet means and concealing the fulcrumed end of the lever, and said exposed portion including a lug carried by the ratchet means and extending from the casing in a manner adapted to project into a suitable opening in the steering column.

WALTER S. SAUNDERS.